Oct. 21, 1947.  E. J. ABBE  2,429,302
STEERING MECHANISM FOR INDUSTRIAL TRUCKS
Filed March 17, 1945  3 Sheets-Sheet 1

INVENTOR.
EDWARD J. ABBE.
BY
Fay, Gobrick & Chilton.
Attorneys.

Oct. 21, 1947.  E. J. ABBE  2,429,302
STEERING MECHANISM FOR INDUSTRIAL TRUCKS
Filed March 17, 1945  3 Sheets-Sheet 2
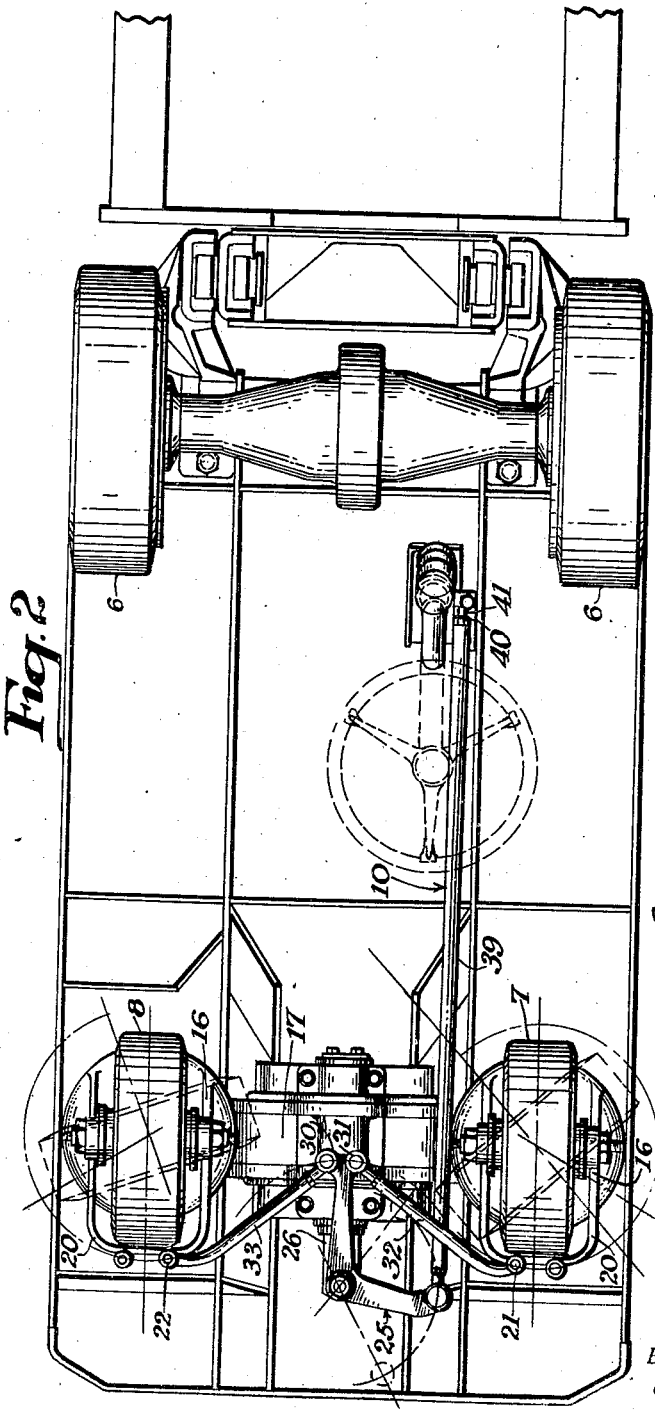
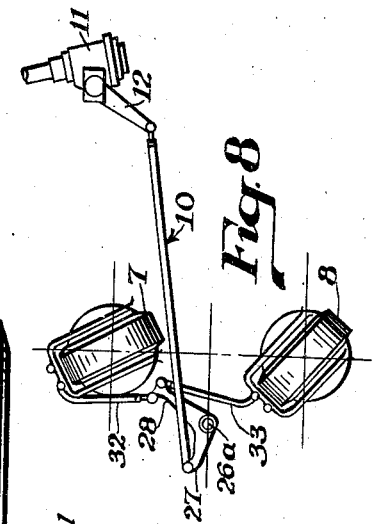
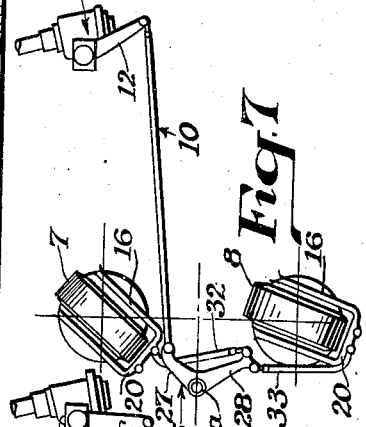
INVENTOR.
EDWARD J. ABBE.
BY Fay, Gobrick & Chilton.
Attorneys.

INVENTOR.
EDWARD J. ABBE.

Patented Oct. 21, 1947

2,429,302

UNITED STATES PATENT OFFICE 2,429,302

STEERING MECHANISM FOR INDUSTRIAL TRUCKS

Edward J. Abbe, Cleveland Heights, Ohio, assignor to The Ellwell-Parker Electric Company, Cleveland, Ohio, a corporation of Ohio Application March 17, 1945, Serial No. 583,193

2 Claims. (Cl. 280—95)

1

The present invention relates to steering mechanisms, and more particularly to steering mechanisms for industrial trucks wherein exceedingly short turns are required.

In certain types of industrial trucks the steering is accomplished through trailer wheels of the truck, and in order to make sharp turns without causing excessive wear of the tires there is provided a differential in the degree of steering movement of the wheels about their steering pivots.

It is an object of the present invention to provide a steering mechanism for industrial trucks, or the like, in which caster mounted steering wheels may be moved through maximum steering angles about their steering pivots. Two relatively short link members which interconnect each steering wheel with a lever pivoted intermediate the wheels, have points of connection with the lever spaced laterally so that when the lever is moved about its pivot in a plane substantially normal to the axes of the steering pivots, there will be a differential in the degree of rotation of the steering wheels about their respective pivots.

Another object of the invention is to mount the pivoted lever in such a way that it is carried by the axle of the truck, which axle interconnects the two steering wheels, so that the lever tilts with tilting of the axle. Thus, when the wheels travel over uneven surfaces the lever moves with the axle and thereby maintains its position relative to the links interconnecting the lever and wheels so that vibration of the wheels about their steering pivots will not occur.

A further object is the provision of a simple steering mechanism for caster mounted type steering wheels wherein the link center lines and steering arms and the wheel axes lie substantially in a common plane and the pivotal connections of the links to the caster mountings are disposed to provide steering arm radii which are greater than the wheel radius.

Other objects and advantages of the invention will be apparent from the following description of a preferred form of the invention, reference being had to the accompanying drawings wherein:

Fig. 2 is a bottom plan view of the truck shown in Fig. 1;

2

Figure 1:
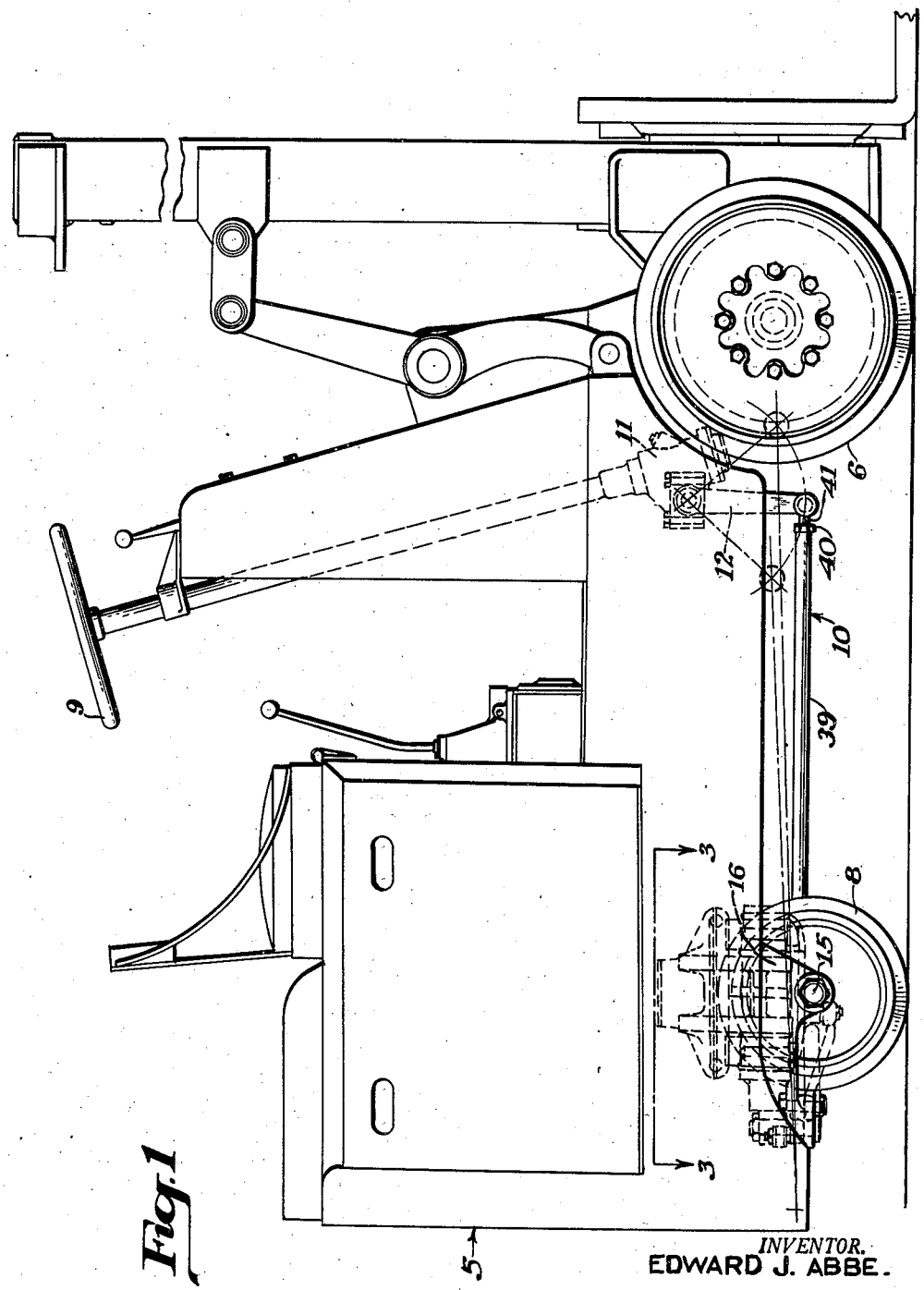
Fig. 1 is a side view in elevation of an industrial truck embodying my invention.

Fig. 6 is a diagrammatic illustration of the steering mechanism, as viewed from above, showing the relative positions of the parts when the truck is steered in a straight line;

Fig. 7 is a view similar to Fig. 6 but showing the relative position of the parts when the dirigible wheels are turned to one extremity of their steering course; and Fig. 8 is a view similar to that of Fig. 7, but showing the wheels turned to the opposite extremity of their steering course.

Referring to the drawings, I have shown an industrial truck, indicated generally at 5, embodying my invention, although it is to be understood that the invention might be embodied in other similar types of vehicles. The truck 5 is provided at the front with a load elevating mechanism and a gasoline motor, located at the rear of the truck, drives non-dirigible front wheels 6 through a suitable gear transmission, not shown. The rear wheels 7 and 8 are caster mounted type dirigible wheels which are steered by a steering wheel 9 which actuates a steering link 10 through a suitable gear reduction mechanism 11, the link 10 being connected with the mechanism 11 by an arm 12.

The wheels 7 and 8 are mounted on individual axles 15 which are journalled in the lower ends of caster frames 16. The frames 16 straddle the wheels and the upper portions, or yokes, of the frames 16 are pivotally attached to the ends of an axle member 17, upon which the rear of the truck chassis is mounted. Preferably, the frames 16 are formed having a ball bearing race indicated at 18, which is complementary to a similar race formed adjacent the ends of the axle 17 so that ball bearings may be placed in the races for providing broad load receiving areas and friction reducing connections between the frames and the axle 17.

The frames 16 include a rearwardly extending portion 20 which extends about and encloses an upper segment of the wheels 7 and 8 and on each spindle a bored knuckle is formed, as indicated at 21 and 22. The knuckles are preferably located slightly above a horizontal plane extending through the centers of the axles 15 and lie outside of the periphery of the wheels 7 and 8, respectively. The knuckles form pivotal connections between steering links, to be described more fully hereinafter, and the portions 20 of the frames 16 whereby the frames may be rotated about their pivots by the links for steering the wheels 7 and 8. Thus, the rearwardly extending portions 20 of the frames form steering arms by which the dirigible wheels are turned.

A bell crank lever 25 is pivoted on a support member 26 that is integral with the axle 17 by a vertically extending pin 26ª, which pin is secured in place by nuts threaded on either end thereof.

The lever 25 includes an arm 27 and an arm 28 which extends substantially at right angles to the arm 27, but in a plane below the plane of the arm 27. The steering link 10 is pivotally connected to the outer end of arm 27 and when the link 10 is moved longitudinally, the arm 27 of crank lever 25 is swung in a horizontal plane about the vertical axis of the lever 25. The outer end of arm 28 is provided with two bored knuckles 30 and 31, which are spaced from one another and which lie slightly below the horizontal plane extending through the axles 15 of the dirigible wheels 7 and 8.

Figure 3:
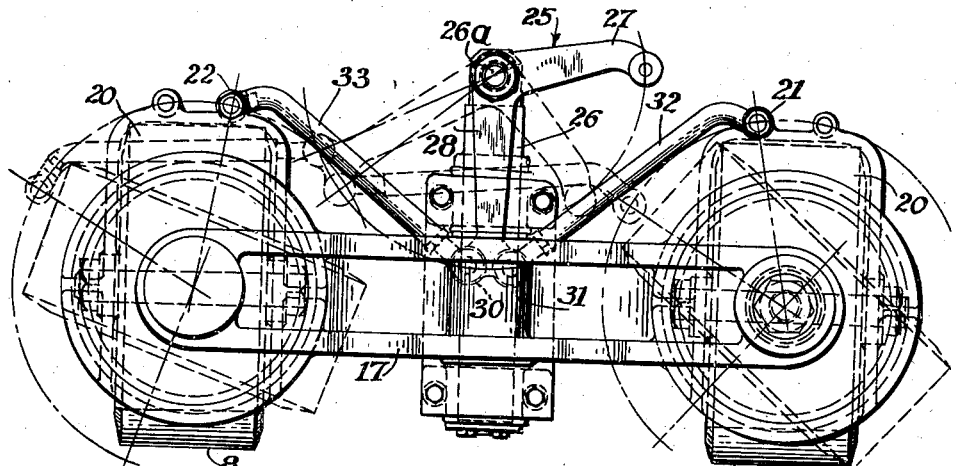
Fig. 3 is a view of the dirigible wheels of the truck taken on line 3—3 of Fig. 1, certain parts of the truck are not shown, however, for the sake of clarity.
Figure 4:
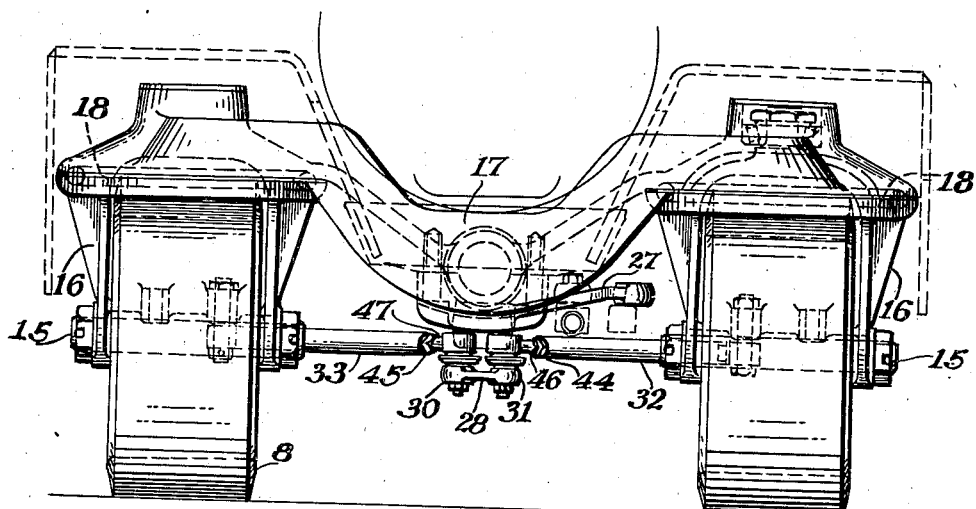
Fig. 4 is a front view of the mechanism shown in Fig. 3.
Figure 5:
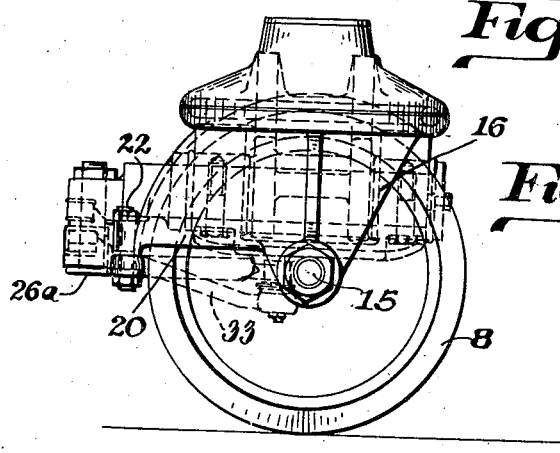
Fig. 5 is a side view of the mechanism shown in Fig. 3.

The knuckle 21 of the spindle for the wheel 7 is linked with the knuckle 31 of the arm 28 by a J-shaped steering link 32. The connections are made by pins extending through the respective knuckles 30 and 31 and similar bored knuckles at each end of the link 32. The knuckle 22 of the frame 16 for the wheel 8 is linked with the knuckle 30 of arm 28 by a link 33 which is similar to the link 32 and which link is connected with the knuckle in a similar manner to that described with reference to the link 32. Thus, when the crank lever 25 is rotated about its axis the dirigible wheels will be moved about their vertical axes. By referring to Figs. 2, 3, 7 and 8 it will be seen that the angular degree of rotation of the dirigible wheels about their vertical axes is not equal and that the radius of the arc of the outside turning wheel will be shorter than the radius of the arc of the inside wheel. This is due, in part, to the spacing of the knuckles 30 and 31, that is, the points of connection of the links 32 and 33 with the end of arm 28.

It will also be noticed that the points of connection of the links 32 and 33 with the steering arm 28 and the knuckles 21 and 22 of the frames 16 lie in a common plane which passes substantially through the center of the axles 15 of the dirigible wheels. This, together with the fact that the links 32 and 33 are connected with the frame 16 at a point outside of the periphery of the dirigible wheels provides a high degree of leverage for the turning of the dirigible wheels about their vertical axes.

By mounting the bell crank lever 25 on an integral part of the axle 17, the bell crank maintains its position relative to the links 32 and 33 and wheels 7 and 8 at all times, although the wheels 7 and 8 may pass over uneven surfaces. Thus, the steering of the wheels 7 and 8 are unaffected by rough surfaces traversed by the truck and vibration of the wheels due to such action is obviated.

In order to provide adjustment of the various elements of the steering mechanism for properly aligning the steering wheels 7 and 8, provision is made for adjusting the effective length of the steering link 10. This is accomplished by forming the link of a tubular member 39 and rotatably securing an internally threaded member 40 to one end of the tubular member. A shaft 41 is threaded into the member 40 and extends into the tubular member 39. By turning the member 40, the shaft 41 may be telescoped more or less with member 39. Similarly, the links 32 and 33 are formed of tubular members having internally threaded members 44 and 45 rotatably secured thereto and shafts 46 and 47 are threaded in said members 44 and 45, respectively, and extend into the tubular portions of the links, according to the angular adjustments of the members 44 and 45, respectively.

Although I have described but one form of the invention, it is to be understood that other forms may be adopted, all falling within the scope of the claims which follow.

I claim:

1. In an industrial truck, an axle; a pair of wheels each pivotally supported at opposite ends of said axle for rotation about a substantially vertical axis for steering said truck, each of said wheels having a steering arm connected therewith for moving said wheels about said vertical axes, respectively; a support member mounted on the central part of said axle and having a part extending laterally from the axle and in a horizontal plane, said member being supported solely by said axle; a bell crank lever pivotally mounted adjacent to the extended end of said member for rotation about a vertical axis, one arm of said lever normally extending and terminating beneath said axle and the other arm of said lever normally extending substantially parallel with said axle; a link interconnecting the end of said one arm of the bell crank lever with one of said steering arms; and a second link interconnecting said end of said one arm with the other of said steering arms.

2. In an industrial truck, an axle; a pair of wheels each pivotally supported at opposite ends of said axle for rotation about a substantially vertical axis for steering said truck, each of said wheels having a steering arm connected therewith for moving said wheels about said vertical axes, respectively; a support member mounted on the central part of said axle and having a part extending laterally from the axle and in a horizontal plane, said member being supported solely by said axle; a bell crank lever pivotally mounted adjacent to the extended end of said member for rotation about a vertical pivot, one arm of said lever normally extending and terminating beneath said axle and the other arm of said lever normally extending substantially parallel with said axle; a link interconnecting the end of said one arm of the bell crank lever with one of said steering arms; a second link interconnecting said end of said one arm with the other of said steering arms; and a steering link extending substantially longitudinally of said truck and having one end connected to said other arm of said bell crank lever for moving the latter about its pivot.

EDWARD J. ABBE.

REFERENCES CITED

The following references are of record in the file of this patent:

UNITED STATES PATENTS

| Number | Name | Date |
| --- | --- | --- |
| 1,148,864 | Seisel | Aug. 3, 1915 |
| 1,164,925 | Clapp | Dec. 21, 1915 |
| 1,676,322 | Chilton | July 10, 1928 |
| 1,991,577 | Remde | Feb. 19, 1935 |
| 724,149 | Whalley | Mar. 31, 1903 |
| 2,107,384 | McQueen | Feb. 8, 1938 |
| 1,267,870 | Huff | May 28, 1918 |
| 601,231 | Blackburn | Mar. 29, 1898 |